United States Patent
Greenberger et al.

(10) Patent No.: US 8,243,141 B2
(45) Date of Patent: Aug. 14, 2012

(54) ADJUSTING A CONTENT RENDERING SYSTEM BASED ON USER OCCUPANCY

(76) Inventors: Hal P. Greenberger, Natick, MA (US); Santiago Carvajal, Ashland, MA (US)

( * ) Notice: Subject to any disclaimer, the term of this patent is extended or adjusted under 35 U.S.C. 154(b) by 1394 days.

(21) Appl. No.: 11/892,171

(22) Filed: Aug. 20, 2007

(65) Prior Publication Data

US 2009/0052859 A1   Feb. 26, 2009

(51) Int. Cl.
  *H04N 7/18* (2006.01)
(52) U.S. Cl. .......... 348/155; 348/553; 348/730; 725/10; 725/12; 725/142
(58) Field of Classification Search .......... 348/553, 348/730, 155; 386/226–229; 725/10–12, 725/89, 142
See application file for complete search history.

(56) References Cited

U.S. PATENT DOCUMENTS

| | | |
|---|---|---|
| 6,259,486 B1 | 7/2001 | Mahvi |
| 6,518,561 B1 | 2/2003 | Miura |
| 6,677,589 B2 | 1/2004 | Hironaka et al. |
| 7,312,450 B2 | 12/2007 | Fukui et al. |
| 2004/0051813 A1* | 3/2004 | Marmaropoulos ........... 348/553 |
| 2007/0033607 A1* | 2/2007 | Bryan ............................. 725/10 |
| 2007/0229465 A1* | 10/2007 | Sakai et al. .................... 345/173 |
| 2008/0052710 A1 | 2/2008 | Iwai et al. |

FOREIGN PATENT DOCUMENTS

| | | |
|---|---|---|
| GB | 2439763 | 1/2008 |
| JP | 09171422 | 6/1997 |
| JP | 09179507 | 7/1997 |
| JP | 10049094 | 2/1998 |
| JP | 11191925 | 7/1999 |
| JP | 2000295543 | 10/2000 |
| JP | 2006-253981 | 9/2006 |
| WO | 2007026532 | 3/2007 |
| WO | 2007026615 | 3/2007 |

* cited by examiner

*Primary Examiner* — Kristine Kincaid
*Assistant Examiner* — Sumaiya A Chowdhury
(74) *Attorney, Agent, or Firm* — Bose Corporation (57) ABSTRACT

User occupancy is monitored within a space in which a video display of a content rendering system is viewable. The user occupancy can be monitored based on physical user attributes. At least one of audio rendering and video rendering by the content rendering system is adjusted based on the monitored user occupancy.

17 Claims, 6 Drawing Sheets

| State Transition Table | | | |
|---|---|---|---|
| Event \ Current | *Primary Mode* | *Secondary Mode* | *Power Off* |
| Power On Command | X | Primary Mode | Primary Mode |
| Power Off Command | Power Off | Power Off | X |
| Occupancy Detected | X | Primary Mode | X |
| Timer Exceeds Threshold | Secondary Mode | X | X |
| Sensor Disable | X | Primary Mode | X |
| Remote Control Video Command | X | Primary Mode | X |

ADJUSTING A CONTENT RENDERING SYSTEM BASED ON USER OCCUPANCY

TECHNICAL FIELD

This disclosure relates to adjusting a content rendering system based on user occupancy.

BACKGROUND

Televisions and other display systems can render audio and video content for users. Sometimes, a user may leave the general space (e.g., a room) where such a system is operating but may still wish to use some portion of the system. For example, a user may leave a room where a television is operating but may wish to hear audio from the television.

SUMMARY

In one general aspect, a method involves monitoring, based on physical user attributes, user occupancy within a space in which a video display of a content rendering system is viewable. The method further involves selectively adjusting at least one of audio rendering and video rendering by the content rendering system, based on the monitored user occupancy.

Implementations may include one or more of the following features. For example, monitoring user occupancy may involve using at least one of ultrasonic detection, pyroelectric detection, thermal detection, and visual detection. In some implementations, monitoring user occupancy may be performed by the content rendering system.

The monitoring may involve monitoring user occupancy based on user motion within the space. The monitoring may involve determining a presence of a user within the space based on user motion in the space and determining an absence of a user from the space based on a lack of motion in the space for a predetermined amount of time.

Adjusting at least one of audio rendering and video rendering by the content rendering system may involve reducing a degree of video rendering by the display device in response to the detected absence. Reducing a degree of video rendering may involve changing an operating mode of the video display from an active mode to a standby mode such that power consumption of the content rendering system is reduced.

Adjusting at least one of audio rendering and video rendering by the content rendering system may involve increasing a degree of video rendering by the display device in response to a detected presence of the user within the space. Increasing a degree of video rendering may involve activating the video rendering in response to a command from a remote control.

Monitoring user occupancy may involve segmenting the space into regions. It may further involve detecting movement of a user from a first region in the space to a second region in the space different than the first region.

In some implementations, the method may further involve activating, based on the monitoring, a function in a recording device.

In another general aspect, a method may involve monitoring, based on user motion, user occupancy within a space in which a display of a content rendering system is viewable. The method may further involve reducing a power consumption of the content rendering system while maintaining rendering of at least a portion of content during the reduced power consumption, based on the monitored user occupancy.

Implementations may include one or more of the following features. For example, reducing a power consumption may involve deactivating a rendering of video by the display. Rendering at least a portion of content may involve rendering audio correlated with the video. The video may include video of television program or movie, and the correlated audio may include audio of the television program or movie.

In another general aspect, a system comprises a content rendering device rendering audio and video portions of multimedia content. The system further comprises an occupancy sensor configured to detect user presence and user absence within a space in which the rendered video is viewable based on motion within the space. The system comprises a controller configured to adjust the content rendering system based on the user presence and the user absence. The controller adjusts the content rendering system to operate in a reduced power consumption mode in which power consumption is reduced while at least a portion of the multimedia content is rendered.

Implementations may include one or more of the following features. For example, the content rendering device may include a television device. In some implementations, the content rendering device may include a computer display.

The occupancy sensor may be located in the content rendering device. The occupancy sensor may utilize at least one of an ultrasonic detector, a pyroelectric detector, a thermal detector, and a video capture device.

The controller may be configured to activate a function in a recording device based on the detected user absence and presence. The controller may be configured to transmit information reflecting the detected user absence and presence.

In another general aspect, a system is configured to detect, based on motion in a space in which a person can view a video display, whether a person is present in a space. The system is further configured to, if the person is not present, turn off at least a rendering of video by the video display while maintaining a rendering of audio correlated with the video.

Implementations may include one or more of the following features. For example, the motion in the space may be detected using a motion sensor coupled to the video display. In some implementations, the system may be configured to activate a function in a recording device if the person is not present.

In another general aspect, a computer readable medium stores a computer program product. The computer program product includes instructions that, when executed, cause at least one processor to: monitor, based on user motion, user occupancy within a space in which a display of a content rendering system is viewable; and, based on the monitored user occupancy, cause the content rendering system to operate in a reduced power consumption mode in which power consumption is reduced while at least a portion of content is rendered.

In another general aspect, an integrated audio and video rendering device comprises a video rendering module configured to render a video portion of multimedia content. The device further comprises an audio rendering module configured to render an audio portion of the multimedia content and operable as a standalone audio reproduction device. The device comprises a controller configured to operate the integrated audio and video rendering device in a reduced power consumption mode in which the video rendering module is disabled and the audio rendering module operates as the standalone audio reproduction device.

Implementations may include one or more of the following features. For example, the video rendering module and the audio rendering module can be co-located in a television device. The integrated audio and video rendering device can comprise an optical disc player.

Other features and advantages will be apparent from the following description and the claims.

DESCRIPTION

In some examples, a content rendering system, such as a television or part of a television, may be controlled or adjusted based on user occupancy within a space in which the content rendering system is situated or viewable to a user. User occupancy refers, for example, to a user presence or a lack of presence (i.e., absence) in an identified space. User occupancy can be determined, for example, by detecting physical or bodily attributes or characteristics (heat, bodily movement, sound, etc.) of the user. In some examples, occupancy can be determined by detecting motion or location in a space and inferring an occupant is present when motion or location is detected. User occupancy can also be determined, for example, by detecting identification or other information associated with a user, such as an electronic information signature or code.

In some examples, an occupancy timer may be used to determined user occupancy. The timer may reset every time user presence is determined in a viewing space, for example, by the detection of motion. User occupancy can be determined by inferring that the user is not present in the viewing space when the timer exceeds a certain threshold, for example, fifteen minutes. If this threshold is not reached, presence of the user in the space can be inferred.

In some examples, the content rendering system can be controlled based on user attentiveness. User attentiveness may refer to a user's level of attention or awareness concerning the content rendering system. User occupancy can be used to determine or infer user attentiveness. For example, the identified space can include different regions or locations, and a level of attentiveness can be inferred if a user moves from one region (e.g., a couch) to another region (e.g., an office desk).

User occupancy may be monitored using one or more sensors, which may be located in the content rendering system and/or in an external module, such as a set-top-box. The sensors may detect various physical attributes and other information and be used to trigger the occupancy timer to reset.

In some implementations, if user absence within the viewing space is detected (e.g., by detecting no motion), all or a portion of the content rendering system (e.g., its performance) may be adjusted. For example, a video display of a television may be disabled or adjusted while an audio device in or coupled to the television remains active to render audio correlated with the disabled video. In some examples, both the audio and the video can be adjusted (e.g., disabled). When user presence is again detected (e.g., by detecting motion), normal performance of the content rendering system may be restored. The occupancy monitoring may be customized or disabled or otherwise controlled by the user, for example, by manipulating sensor settings and associated control components.

The performance of the content rendering system may be adjusted for various purposes. In some examples, the performance may be adjusted to achieve a reduction (e.g., 50%) in power consumption. Performance may be adjusted so as to reduce power consumption in accordance with environmental standards, such as those of the ENERGY STAR® program established by the U.S. Environmental Protection Agency. The performance adjustments may be customized or disabled or otherwise controlled by the user. For example, the user can control the level of power consumption reduction.

In some examples, video from a video display of a content rendering system (e.g., a television, a computer monitor, etc.) is deactivated when there is no occupancy or presence in the viewing space (e.g., a room in which the television is located) while audio correlated with the video (e.g., the audio portion of a television program, a movie, or streaming multimedia) from an audio device is maintained. Deactivating the video display can involve placing the display in standby (e.g., a reduced-power mode) or completely powering it off. The video may be deactivated in order to reduce a power consumption of the content rendering system. Video may be re-activated (e.g., turned back on) when user occupancy or presence is again detected in the space (e.g., a user enters the room) or in response to some user command (this can be settable). The video can be activated and deactivated based on an occupancy timer, which can reset every time occupancy is determined, for example, by the detection of motion.

In some implementations, a content rendering system may include a device, such as a television, with integrated video and audio functionality. In such implementations, the system may be useable solely as an audio rendering system. For example, the integrated audio component can include high-quality loudspeakers and audio amplification, and may further include a high-quality compact disc (CD) or other optical media player (or provide an interface to an external optical media player such as a CD or DVD player) for playing audio from optical media (e.g., CDs) without any correlated video.

Implementations in which the content rendering system is an integrated audio and video device may involve operating the system in an audio-only mode. This can be a manually switchable mode, where the device is used solely as an audio rendering system. Additionally or alternatively, this audio-only mode can be triggered or controlled based on monitored user occupancy. In the audio-only mode, the video can be disabled so that the system is placed in a lower power consumption state. A user may wish to operate the system in such an audio-only mode, for example, where it is desired to operate the system as a standalone audio reproduction device (e.g., for playing CDs).

Figure 1:
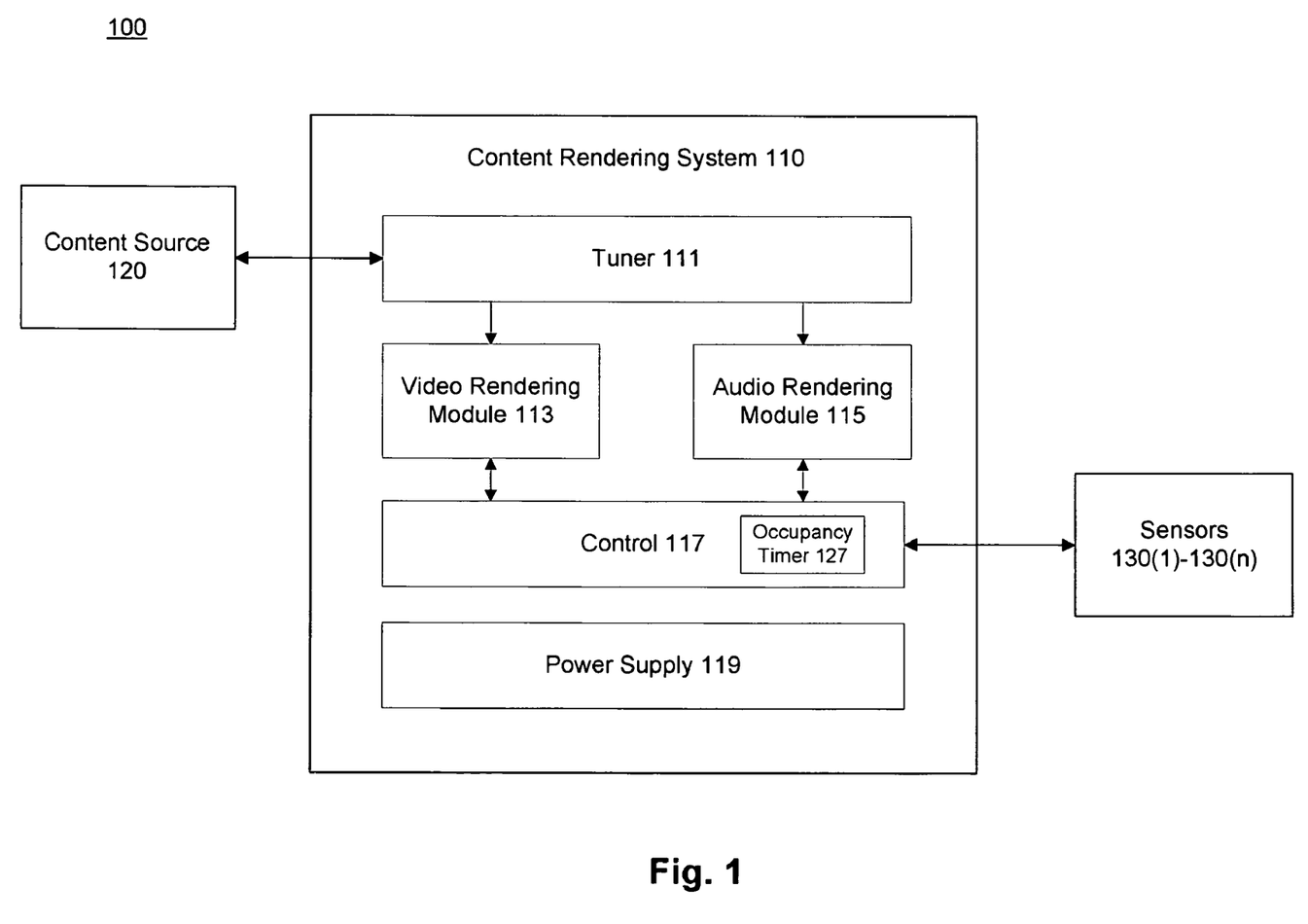
FIG. 1 is a block diagram of an example system.

With reference to FIG. 1, a system 100 may include a content rendering system 110, a content source 120, and one or more sensors 130(1)-130(n). The number, identity and arrangement of components in the system 100 are not limited to what is shown, and additional and/or different components may be contained in or coupled to the components shown.

The content rendering system 110 represents any system suitable for rendering audio and/or video content. The content rendering system 110 may, for example, render audio and/or video associated with television broadcasts, radio broadcasts, satellite broadcasts, network transmissions, streaming media, movies and/or other information from various storage media, etc. In some implementations, the content rendering system 110 may include a telecommunication system operable to receive signals from a remote source 120 and render associated pictures and sound for a user.

Examples of content rendering systems include television devices, such as a cathode-ray tube (CRT) television, a front or rear projection television, or a flat panel television such as an LCD or plasma. Other examples of content rendering systems include computer monitors, which may be coupled to processing systems. Content rendering systems may also include audio components, home theater systems, portable entertainment and computing devices, and any other systems that render audio and/or video content.

The content rendering system 110 may include an integrated device to render audio and video content in a single package. For example, the content rendering system 110 may be a television or computer monitor that plays both the audio and video portions of television programs, movies, etc. The content rendering system 110 could also be a distributed system including an audio sub-system (e.g., a source, an amplifier, and speakers) and a video subsystem (a source, a projector or video display, and a screen).

In some configurations, the content rendering system 110 may include a tuner 111, a video rendering module 113, an audio rendering module 115, control 117, and a power supply 119. The number and arrangement of these components are not limited to what is shown in FIG. 1, and other numbers and arrangements are possible.

The tuner 111 may include one or more hardware and/or software components to enable the content rendering system 110 to capture and/or receive signals from a source, such as the source 120. The tuner 111 may pass certain radio frequencies and exclude other frequencies. The tuner 111 may allow reception of analog signals, such as amplitude- and frequency-modulated VHF and UHF television signals (e.g., PAL, SECAM, NTSC signals). The tuner 111 may also allow reception of digital data, such as digital television (DTV) packets. The tuner 111 may be located within a television device and/or implemented as an external device, such as a cable box. In some implementations, the tuner 111 could be implemented as a PCI (Peripheral Component Interconnect) or USB (Universal Serial Bus) compatible device.

The tuner 111 may include one or more connectors (not shown) for receiving information from the source 120. For example, the tuner 111 may include one or more RF antenna inputs. It may also include one or more composite, s-video, or component video connectors, as well as one or more DVI (digital visual interface) or HDMI (high definition multimedia interface) connectors. The tuner 111 may additionally include, for example, one or more phono (e.g., RCA), coaxial, AES/EBU, XLR, S/PDIF, TOSLINK, and/or USB connectors.

The tuner 111 may include one or more components for processing received information and generating appropriate audio and video signals for display. The tuner 111 may include, for example, components for performing demodulation, demultiplexing, analog-to-digital conversions, digital-to-analog conversions, and decompressions. The tuner 111 may also perform various formatting operations, such as interlace to progressive scan conversions, aspect ratio conversions, frame rate conversions, and resolution changes.

The video rendering module 113 receives information from the tuner 111 and renders video for display to a user. The video rendering module 113 may be implemented, for example, in hardware or hardware and software. In some examples, the video rendering module 113 may receive electrical signals from the tuner 111 and convert these signals into visible images. The video rendering module 113 may utilize various display technologies, such as a cathode-ray tube, digital light processing (DLP), liquid crystal display (LCD), gas plasma, liquid crystal on silicon (LCoS), light emitting diode (LED), and laser technologies.

The audio rendering module 115 receives information from the tuner 111 and renders audio for display to a user. The audio rendering module 115 may include elements for creating audible sound from electrical signals. The audio rendering module may be implemented, for example, in hardware or hardware and software. The audio rendering module 115 may include one or more data reading devices, digital-to-analog converters, amplifier devices, and/or transducers. In some examples, the audio rendering module 115 may receive electrical signals from the tuner 111 and convert these signals into audible sound waves. These sound waves may be correlated to video displayed by the video rendering module 113. In some implementations, the tuner 111 can pass signals to an external audio rendering device in digital or analog form as well.

The control 117 may interact with the sensors 130(1)-130(n) and monitor user occupancy within an identified viewing space in which the content rendering system 110 is viewable. This identified "space" may include an entire potential area where viewing of a display of the content rendering system 110 could occur or a smaller area. The space may also include one or more identified regions within a larger identified area. As an example, the space can be segmented into three different regions: a video-only region, an audio-only region, and an audio and video region. Other regions are possible. The control 117 may be configured to dynamically determine (e.g., using the sensors 130) the size or configuration of the space or receive inputs that specify the space or other parameters.

The control 117 may also interact with the video rendering system 113, the audio rendering system 115, and/or the power supply 119, and it may adjust or otherwise control the content rendering system 110. For example, the control 117 may be operable to selectively activate, deactivate, and/or otherwise adjust system elements, such as 113, 115 and 119. The control 117 may interact with a network and/or one or more external devices, such as recording devices (e.g., videocassette recorders, digital video recorders) and other content rendering systems (e.g., other television devices).

The control 117 may be implemented using hardware (e.g., semiconductors, electronic components, and mechanical components) and/or software, and it may include various components, depending on the implementation. For example, the control 117 may include one or more connection ports and busses (e.g., USB, RS-232, RS-485, Fibre Channel, Ethernet, IEEE 1394, RG-6, TOSLINK, I2C, etc.) for exchanging information with the sensors 130(1)-130(n) and other external devices. In some implementations, the sensors can communicate with each other and/or control 117 over a low speed serial bus, such as an I2C bus or one of its variants. Other types of busses can also be used. The control 117 may also include a network interface for facilitating communication with a network, such as a shared, public, or private data network encompassing a wide area or local area.

The control 117 may also include memory elements for storing data. The memory elements may include, for example, solid state elements, optical elements, polymer elements, magnetic elements, and/or organic elements (e.g., crystals). The memory elements may be volatile or non-volatile and may be randomly or sequentially accessed. The control 117 may include random access memory (RAM), flash RAM, read-only memory (ROM), erasable programmable read-only memory (EPROM), and electrically erasable programmable read-only memory (EEPROM).

Memory elements in the control 117 may store program code for applications, an operating system, an application-programming interface, application routines and/or other executable instructions. The memory elements may also store program code and information for communications, kernel and device drivers, and configuration information. In one example, the memory elements may store executable instructions for performing aspects of the processes depicted in FIGS. 5A and 5B.

The control 117 may include one or more general- or special-purpose processors configured to execute instructions from one or more memory elements. It may also include intelligence and logical elements or algorithms. In addition, the control 117 may include I/O devices for facilitating user interaction.

In one configuration, to perform monitoring and control functions, the control 117 may include an occupancy timer 127. The timer 127 may be mechanical, electromechanical, digital, or software-based. The control 117 may use information from the one or more sensors 130(1)-130(n) to control the occupancy timer 127. For example, as explained below in connection with FIGS. 5A and 5B, the timer may be reset to zero every time user motion (or some other attribute) is detected within the viewing space. When the timer exceeds a certain threshold, the control 117 may determine that the user is absent from the viewing space. Once the user is detected again, the control 117 may determine that the user is present in the viewing space. The threshold may be any useful amount of time, such as 5 minutes, 10 minutes, or 15 minutes. The threshold may be fixed or adjustable by the control 117 and/or the user.

Functionality of the control 117 may be selectively disabled (overridden) and/or adjusted by a user and/or the control 117 itself. For example, the user can input a command to the control 117 to override the system and/or the control 117 could override on its own based on some detected condition. Users may also adjust and customize functionality of the control 117. For example, a user could specify and adjust sensor sensitivity settings, occupancy and other timer settings, and performance adjustment settings (e.g., the power reduction percentage). The control 117 could include logic for initiating and effecting overrides and adjustments. An override may be performed by the control 117 with or without user involvement.

An override or adjustment can occur any time the system 100 is not functioning as intended for some reason. For example, an override or an adjustment can occur if occupancy cannot be effectively detected in a particular environment. Overrides and adjustments can occur for various other reasons.

As an example, if sensors are interfered with so that they do not correctly detect occupancy, overriding the system will avoid the chance the system will shut off video while the content rendering system (e.g., a television) is being used. As another example, overriding can be performed if a user tends to sit still for a long period of time, making occupancy detection more difficult (if only motion sensors were used to detect occupancy, for example).

In some examples, the control 117 can effect an override or adjustment in response to environmental conditions, such as excess noise, light, or vibration. For example, an override could occur if several people are moving around a room and talking or if an external noise source (e.g., an airplane, an alarm) is detected. An override could also occur if the light in a room exceeds a certain threshold level.

Although FIG. 1 shows the control 117 located within the content rendering system 110, the control 117 (entirely or partially) may be located external to the content rendering system 110. For example, the control 117 may exist as a standalone STB or it may be integrated in a cable box or in a particular sensor.

The power supply 119 supplies energy (e.g., electrical energy) to content rendering system 110. In some configurations, the power supply 119 may convert electrical energy supplied by a utility or other source to energy usable by the content rendering system 110. The power supply 119 can be implemented in various configurations. The power supply 119 can provide direct current (DC) or alternating current (AC), either stepped up or down in level, at either line frequency of some other frequency, with suitable waveshape (e.g., sinusoidal, square, trapezoidal, etc.). The power supply 119 could be a switched-mode power supply or a linear power supply. The power supply 119 may include various components known in the art, such as a transformers, rectifiers, and regulators. In some implementations, the power supply 119 could include one or more batteries, solar cells, generators, and/or alternators.

The content source 120 represents any system or entity that generates and/or routes information for reception by the content rendering system 110. In one example, the content source 120 could be a dedicated audio and/or video playback device, such as a CD player, a digital audio player (e.g., an MP3 player), a VCR (video cassette recorder) or a DVD (digital video disc) player. The content source could include a cable box, a satellite feed, a desktop computer, a storage device or drive or DVR (digital video recorder), a cellular phone, a video camera, a vide game, a handheld computer (e.g., a personal digital assistant), a laptop, or any other device providing information for display to a user. The content source 120 may represent over-the-air electrical signals transmitted by one or more content providers (e.g., radio frequency (RF) signals transmitted by television broadcast stations).

The sensors 130(1)-130(n) represent components used for detecting user occupancy. The sensors 130(1)-130(n) may detect user occupancy within a space in which the content rendering system 110 is situated and/or viewable. As noted above, this "space" may include the entire potential area where viewing of a display of the content rendering system 110 could occur or some smaller area. The space may be predetermined or dynamically determined using the control 117. The sensors 130(1)-130(n) may be implemented using a variety of sensor types. In some implementations, the sensors may detect user occupancy based on physical activities, attributes, and/or emissions associated with a user. Sensors may additionally be configured to receive inputs from one or more devices or networks. For example, RF and IR sensors may detect RF signals and IR (infrared) codes from a remote control or other element. These signals and codes can be used in conjunction with other information, such as detected activities, attributes, and/or emissions, to determine user occupancy.

The sensors 130(1)-130(n) may be configured to detect motion. The sensors may detect motion by measuring changes in speed and/or location of an object in a field of view. In this example, the sensors may include mechanical and/or electronic elements suitable for interacting with and/or quantifying changes in the environment.

The sensors 130(1)-130(n) may also be configured to detect infrared radiation or heat. For example, the sensors may include one or more pyroelectric infrared sensors, such as sensors available from Glolab Corporation. The sensors may include a crystalline material for generating charge when exposed to infrared radiation. The sensors may include suitable elements (e.g., a FET) for measuring changes in the generated charge, which result from changes in the amount of infrared radiation incident on the crystalline material.

In some examples, the sensors 130(1)-130(n) may include optical sensors. The optical sensors may be intensity- or interferometric-based, measuring changes in light intensity and/or phase changes in the light. The optical sensors may detect scattering, spectral changes, reflectance changes, etc. They may also utilize various principles, such as the laser-Doppler and magneto-optic effects. The optical sensors may be controlled by one or more microprocessors. The microprocessors could, in some configurations, be included within the control 117. The optical sensors may use digital signal analysis to produce images of the environment.

In some examples, the sensors 130(1)-130(n) may include video sensors. The sensors may include, for example, one or more video sensors available from Farco Technologies Ltd. The video sensors may connect to a video source, such as a video camera, a VCR or a home security system. Video sensors may receive video signals and detect moving objects in the received signals. The video sensors may operate with logic to detect and recognize patterns in received signals in order to detect movement. This logic may perform frame-by-frame comparisons in order to detect movement from a received video signal. The logic may be included in a particular video sensor or, alternatively, could be embedded within the control 117.

In some examples, the sensors 130(1)-130(n) may include cameras configured to recognize users or user attributes. For example, a camera in a computer system could detect user occupancy by detecting a user sitting in front a computer monitor. The cameras could be used to capture information for additional processing by other sensors or the control 117, or the cameras could be configured with logic for occupancy recognition. In some examples, cameras, independently or in conjunction with other elements, may be configured to recognize and distinguish certain users.

Additionally, the sensors 130(1)-130(n) may include sonic sensors. For example, one or more ultrasonic sensors (e.g., sonar sensors) may be configured with ultrasonic transducers and may transmit and receive acoustic emissions within a field of interest. The ultrasonic sensors may also utilize wave-propagation principles to detect and measure various variables in the environment. The ultrasonic sensors may detect the presence of objects in a field of interest, as well as proximity and propagation changes. Other types of sonic sensors, which may detect non-audio sound emissions, could also be utilized.

The sensors 130(1)-130(n) may be configured to detect user occupancy while disregarding non-user occupancy. That is, the sensors may be configured to detect human occupancy while ignoring non-human activity, such as vibrations (e.g., floor vibrations), temperature changes, sunlight, background noise (vehicle noise), wind, and/or movement of household objects. The sensors could also be configured to ignore certain human activity, such as certain sounds or movements. To accomplish this, the sensors may include or be coupled to logic or circuitry that adjusts sensor sensitivity to compensate for environmental conditions. For example, such logic could adjust sensitivity to ignore sunlight and wind. The logic could also adjust sensitivity to ignore sound emissions from an audio source. In some implementations, the sensors can be configured to discriminate objects based on the size of objects detected as moving in the environment. The sensors could be configured, for example, to ignore pets by discriminating based on object size.

In some examples, the sensors may be configured in a manner that reduces detection of non-user activity. An infrared sensor, for example, may include sensing elements in a voltage bucking configuration. A user passing by the sensor will activate one of the elements first and then another element. Non-user sources will likely affect both elements simultaneously and thus be cancelled. This cancels signals caused by non-user sources, such as vibration, temperature changes and sunlight.

For clarity of explanation, the sensors 130(1)-130(n) are depicted in FIG. 1 as a single discrete block external to the content rendering system 110. Depending on the implementation however the sensors may be geographically dispersed, with one or more sensors located within the content rendering system 110 and one or more sensors located in other locations. Each sensor, whether inside or outside of the content rendering system 110, may be different in type, structure and operation.

A combination of different types and locations of the sensors 130(1)-130(n) may be employed to improve reliability of detection. For example, one or more sensors could detect motion while other sensors detect heat (via thermal imaging). This arrangement may be useful in detecting a user who is lying on a couch in front of the content rendering system 110 but who is not moving for a long period of time. Moreover, the time sequence of monitored parameters or events can be analyzed to understand occupancy or attentiveness. For example, periodic voices interlaced with floor vibrations could be analyzed to determine a level of user occupancy or attentiveness.

Figure 2:
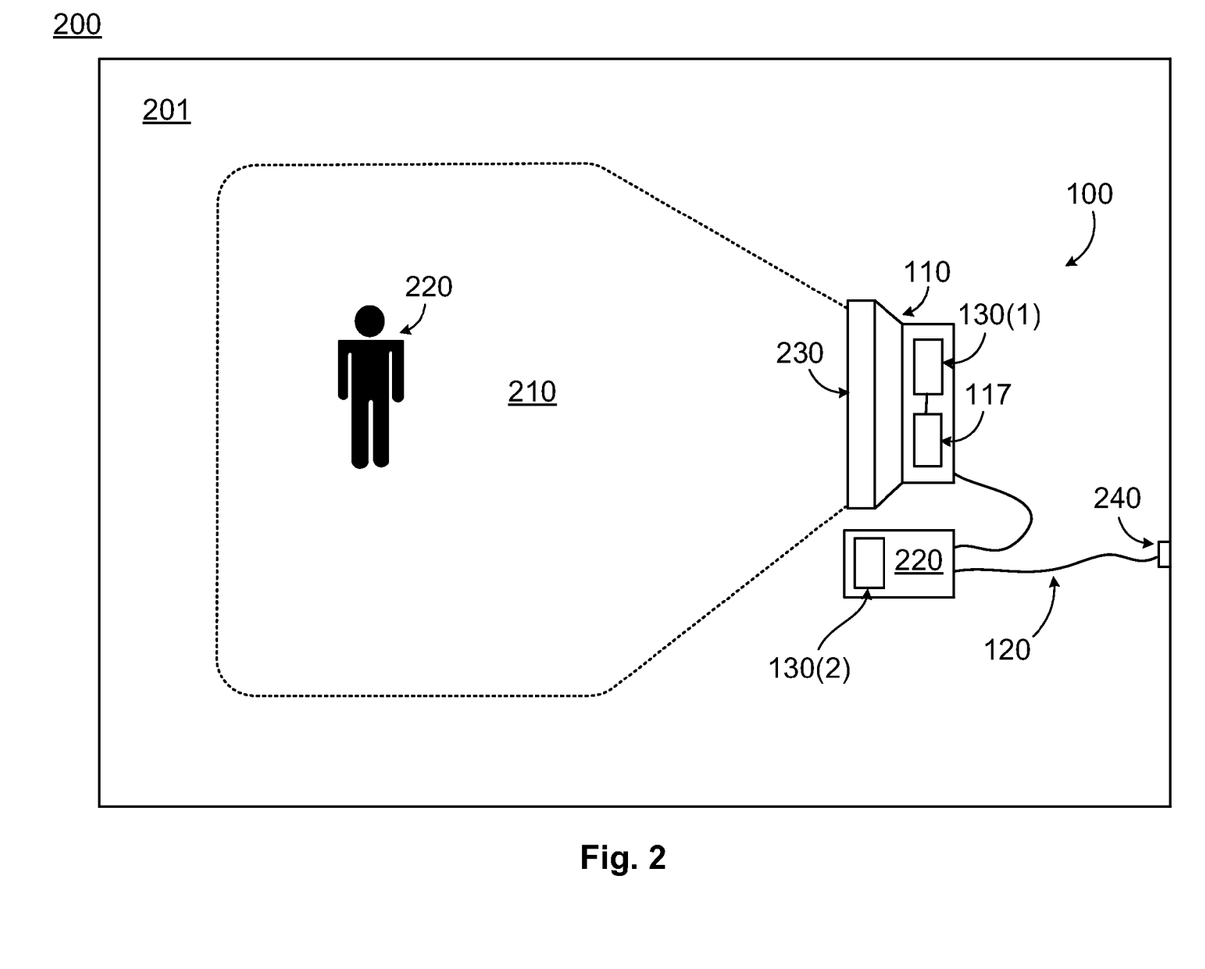
FIG. 2 depicts an example operating environment.

FIG. 2 depicts an exemplary environment 200 in which the system 100 may be implemented. As illustrated, the content rendering system 110 may be located in a room 201. A sensor 130(1) and the control 117 are co-located in the content rendering system 110, while another sensor 130(2) is located in an external set-top-box (STB) 220. The STB 220 may include a cable box, which connects (e.g., via a coaxial link) to a cable connection 240 in the room 201 and serves as the content source 120 feeding the tuner 111 (not shown).

A user 220 may be located within a space 210 in which a video display 230 of the content rendering system 110 is viewable. In operation, the control 117 may use the sensors 130(1) and 130(2) to monitor user occupancy (e.g., absence and presence of the user 220) within the space 210. If user absence within the space 210 is detected, after a period of time, the control 117 may adjust the performance of the content rendering system 110. For example, the control 117 may deactivate the video display 230 so as to achieve a substantial reduction in power consumption by the content rendering system. When user presence is again detected in the space 220, the control 117 may restore the performance of the content rendering system 110.

In some implementations, multiple content rendering systems 110 may be dispersed throughout one or more environments and may be configured to exchange information. For example, a given environment (e.g., a home or business) could include multiple rooms (201) and each room could include a content rendering system 110. Each of the content rendering systems 110 could be of a different configuration. The content rendering systems 110 could be linked (e.g., via a network) and interact using their respective monitored data, to cooperatively control aspects of their performance. Aspects of the content rendering systems could be adjusted depending on the presence and absence of the user in different monitored viewing spaces. For example, as a user moves from room to room, the relevant content rendering systems may detect the presence and absence of the user and adjust aspects of their respective performance in a manner that reduces power consumption in the environment.

For purposes of explanation only, certain aspects of the disclosure are described herein with reference to the discrete functional blocks illustrated in FIG. 1 and FIG. 2. The number and arrangement of illustrated components, however, are not limited to what is shown and other variations are possible. Further, depending on the implementation, certain illustrated components may be absent and/or other varying components not shown may be included.

Figure 3:
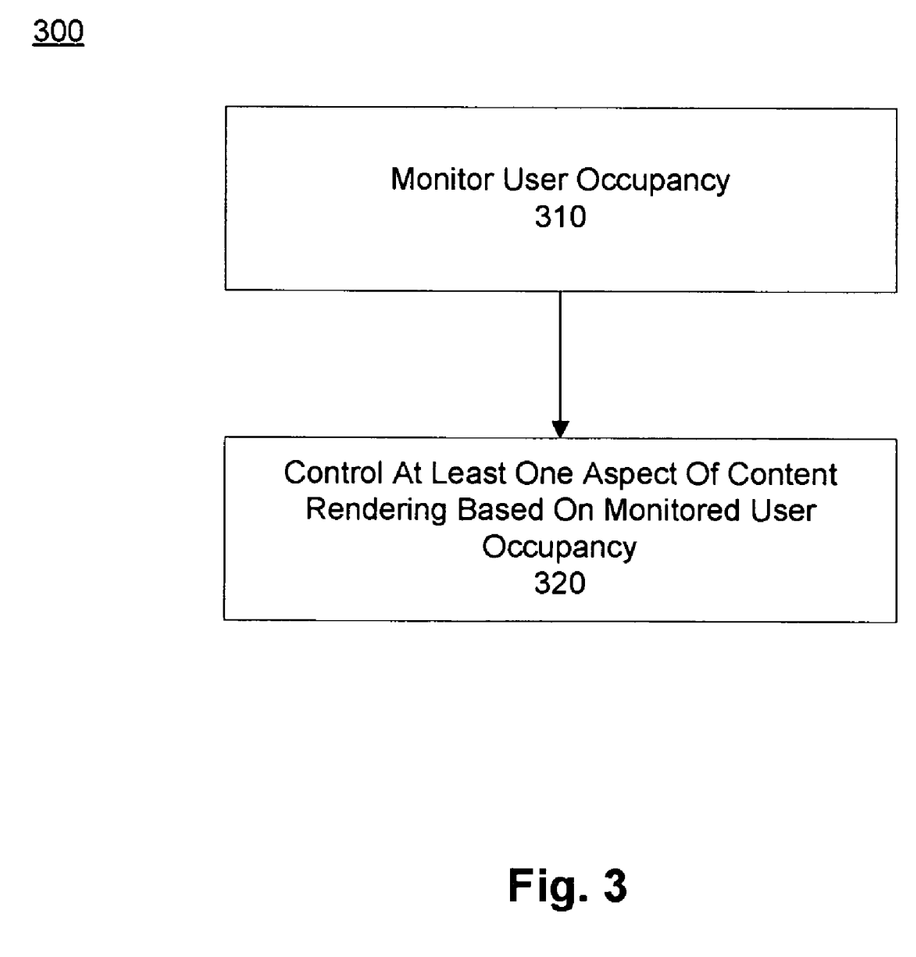
FIG. 3, 5A, 5B and 6 are flow diagrams showing example processes.

FIG. 3 is flow diagram graphically depicting a process 300 for controlling content rendering. The process 300 may include monitoring user occupancy with respect to the content rendering device 110 (310). The process 300 may further involve controlling, based on the monitored user occupancy, at least one aspect of content rendering (320).

Monitoring user occupancy (310) may include monitoring user occupancy within a space in which a display (e.g., 230) of the content rendering system 110 is viewable. In some examples, this may involve monitoring user occupancy within a space in which a video and/or audio display of a television is viewable to a user. In some examples, monitoring user occupancy may involve monitoring user occupancy within a space in which a video and/or audio display of a computer (e.g., a computer monitor) is viewable.

Monitoring user occupancy may involve detecting or determining an absence and a presence of a user within a space in which a display of the content rendering system is viewable. The sensors 130(1)-130(n), independently or in conjunction with the control 117, may monitor user occupancy, for example, by detecting motion or other physical attributes. In some examples, monitoring user occupancy may involve detecting user presence in an identified space in which a television display or computer monitor is viewable using, for example, motion sensors. In some examples, monitoring user occupancy can involve detecting user presence in an identified space using, for example, cameras or other sensors that recognize specific users or user characteristics.

Monitoring user occupancy may include utilizing an occupancy timer (e.g., 127), which may be implemented in the control 117. Every time a user is detected (e.g., by motion), the timer may be reset to zero. When the timer exceeds a certain threshold (e.g., fifteen minutes), user absence may be inferred or determined. Once the user is detected again, user presence may be determined.

In addition to absence and presence of a user within a space, monitoring user occupancy may include monitoring a level of attention given to the content rendering system 110 by one or more users. This may involve monitoring movement within the space to determine a level of attention given to the content rendering system 110. For example, monitoring user attentiveness could include monitoring or detecting movement of a user from a first location in the monitored space (e.g., a couch) where the user watches television to another location within the monitored space (e.g., a desk) where the user engages in another activity (e.g., working on a computer).

The user can configure the different spaces, for example, using the control 117. In the first location, the user may want the content rendering system 110 to perform normal operations. In the second location, the user may wish to deactivate an aspect of the system (e.g., the audio). For example, the user may wish to deactivate audio in a space where the user needs to hear something other than the audio, such as a telephone. In such cases, to facilitate the monitoring, the control 117 may segment a space into different regions and associate the regions within the space with certain activities and content rendering preferences.

The sensors 130(1)-130(n), independently or in conjunction with the control 117, may monitor or detect when a user moves from one region to another region within the monitored space. Other user activities aside from movement could also be monitored to determine a level of attention given to the content rendering system.

In some implementations, monitoring user occupancy (310) may include detecting additional inputs, such as remote control codes, information signatures or other information. These additional inputs could be used in conjunction with other detected information to determine occupancy and/or control content rendering. If an occupancy timer is used, it may be reset in response to a detected input. Monitoring user occupancy (310) may include examining detected remote control codes and determining which features (e.g., volume, channel, source, picture) of the content rendering system 110 are being controlled. In this case, the timer may be reset if certain features (e.g., video) are affected but not if others (e.g., volume) are affected.

Controlling at least one aspect of content rendering (320) may include selectively adjusting video rendering (e.g., by the video rendering module 113) and/or selectively adjusting audio rendering (e.g., by the audio rendering module 115). Adjusting rendering of audio and video may include activating and deactivating the rendering as well as adjusting the rendering in various degrees. Adjusting rendering in degrees may involve adjusting the rendering to various extents or in various levels. For example, adjusting the rendering may involve decreasing and increasing audio volume and/or video brightness to various extents.

In some examples, the controlling (320) may involve adjusting video rending while maintaining audio rendering. This may be based on the monitored user occupancy. For example, the controlling may involve deactivating or otherwise adjusting (e.g., reducing brightness) video rendering in response to a detected absence (or movement) and re-adjusting video rendering in response to a detected presence (or movement) of the user. The controlling may include changing an operating mode of the content rendering system based on the monitored user occupancy. For example, when user absence is detected, the video rendering module 113 may be switched into a standby or power-off mode.

In some examples, controlling at least one aspect of content rendering may involve deactivating a video display of a content rendering system (e.g., a television) when there is no user presence in an identified space (e.g., a room in which the television is located) while audio correlated with the video (e.g., the audio portion of a television program) from an audio device is maintained. Deactivating the video display can involve placing the display in standby or completely powering it off. Video can be re-activated when user presence is again detected in the space or in response to some user command. Activating the video in response to a user command can involve setting and configuring the commands.

Controlling (320) could include selectively adjusting rendering of audio while maintaining rendering of correlated video. For example, when user attentiveness changes (e.g., the user engages in another activity in the viewable space), the audio rendering module 115 could be switched into a standby or some other mode of operation (e.g., a reduced-volume mode) while video rendering is maintained.

Controlling (320) may include controlling or adjusting at least one performance aspect of the content rendering system 110 to reduce a power consumption of the content rendering system. Power consumption may be reduced by any amount, such as 25%, 50%, 75%, or 100%. Power consumption may be reduced such that no power (or a nominal amount of power) is consumed, and/or it may be reduced in various degrees or gradations. Power consumption may be reduced according to an environmental or other standard, such as the ENERGY STAR® program. In one example, when user absence is detected by the monitoring, the video rendering module 113 may be switched into a standby mode in which little or no power is consumed. Power consumption can be reduced over time in a manner that depends on time-generated changes in user occupancy or attentiveness.

In some examples, the controlling (320) may involve reducing a power consumption of the content rendering system while simultaneously rendering at least a portion of content (e.g., a television program, movie, streaming multimedia, etc.) by the content rendering system during the reduced power consumption. For example, a video portion of content may be adjusted (e.g., disabled) to reduce power consumption while a correlated audio portion of the content is maintained. The controlling may involve causing or adjusting the content rendering system to operate in a reduced power consumption mode in which power consumption is reduced (e.g., by adjusting video) while a portion of content is rendered (e.g., maintaining audio rendering).

In some examples, the controlling (320) may involve controlling an aspect of content rendering based on regions or zones with the monitored space. There can be multiple zones and operation can be switched as occupancy is monitored in the different zones. The controlling of content rendering in the different zones can be based on user settings and preferences.

As an example, the user can segment the space into three different regions: a video-only region, an audio-only region, and an audio/video region. Rendering can be maintained if occupancy is detected in any zone that requires it. For example, if there is a person in the audio/video zone, then audio and video can be rendered, regardless of whether or not others are located in the different zones. If an individual is in the audio only zone, audio can be rendered. If a second individual is in the video only zone, then both audio and video can be rendered.

Various other actions may occur in response to the monitoring (310). For example, based on the monitoring, a function in a recording device may be activated. This may be performed by the control 117. In some examples, a particular television program can be recorded if occupancy is not detected, so that the program is not missed. A recording buffer may be maintained or accessed, for example, by the control 117. The recording buffer may be used in conjunction with the occupancy timer to record certain information based on occupancy. In some examples, the recording buffer could be configured as a thirty-minute recording buffer and the occupancy timer could be configured with a fifteen-minute threshold. When occupancy is no longer detected, program material could be recorded from a time when there last was occupancy until such time as the recording is stopped by the user, or for a fixed time (e.g., 2 hours).

In some examples, information representing the monitoring may be transmitted from the content rendering system 110 to at least one other content rendering system 110 or other device. In this fashion, multiple content rendering systems 110 could interact using their respective monitored data, to cooperatively control aspects of their performance. For example, the control 117 may send information from a first television over a network to another television. The information sent may indicate that a user in not currently viewing the first television. The televisions may use the exchanged information to cooperatively control their respective performance (e.g., activation and deactivation of audio and/or video).

Aspects of monitoring and/or controlling may be defeatable, either in response to a user command or in response to some other trigger. Aspects of monitoring and/or controlling may also be adjusted and customized by a user. For example, the user could specify and adjust sensor sensitivity settings, timer settings, and performance adjustment settings.

Figure 4A:
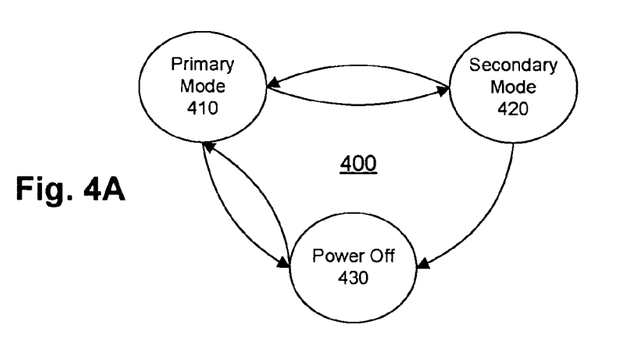
FIG. 4A is a state diagram showing example system states.

FIG. 4A illustrates a state diagram 400 showing exemplary operating modes of the content rendering system 110. As illustrated in FIG. 4A, in some implementations, the content rendering system 110 may operate in a primary mode 410, a secondary mode 420, and a power off mode 430. The primary mode 410 may represent a normal operating mode, in which video and audio is rendered. The content rendering system 110 may exhibit full power consumption when operating in the primary mode 410. The secondary mode 420 may represent an operating mode in which the content rendering system is controlled based on detected user occupancy. In the secondary mode 420, at least one aspect of the system performance could be adjusted. For example, in the secondary mode 420, the content rendering system 110 may render audio but not video. In the secondary mode 420, the content rendering system 110 could reduce volume or reduce brightness. The power off mode 430 represents an operating mode in which the content rendering system 110 consumes a nominal amount (or no amount) of power. The power off mode 430 could be a sleep mode, a standby mode, or a situation where power is disconnected from the power supply 119.

Figure 4B:
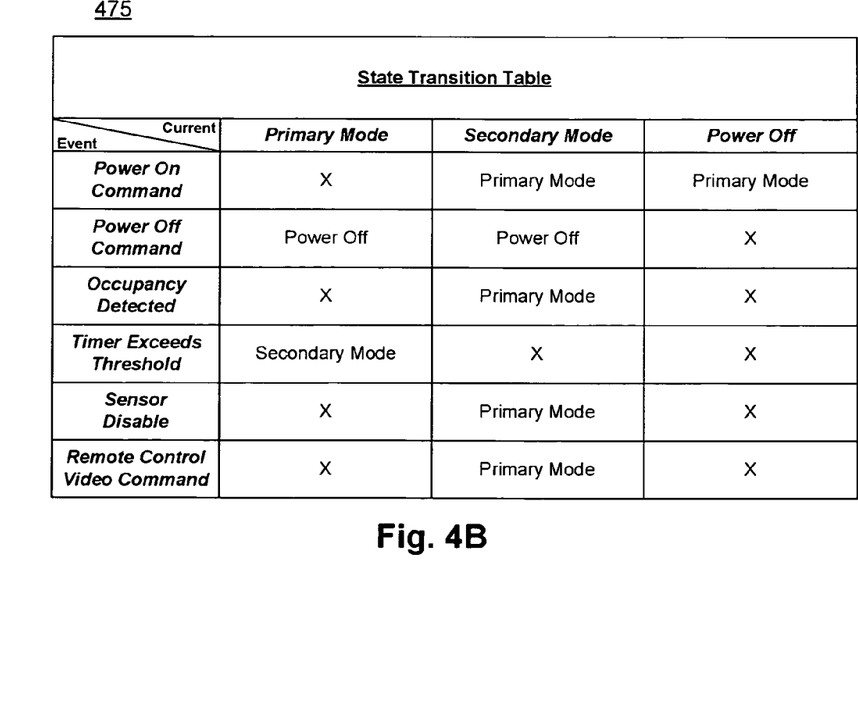
FIG. 4B is a state transition table associated with the diagram of FIG. 4A.

FIG. 4B illustrates a state transition table 475 associated with state diagram 400. As indicated in the table 475, the content rendering system 110 may switch into the primary mode 410 from the power off mode 430 when a power on command is received. Once in the primary mode 410, the system may transition back to the power off mode 430 in response to a power off command or a shutoff timer. The content rendering system 110 may alternatively transition from the primary mode 410 to the secondary mode 420 when an occupancy timer exceeds a threshold (e.g., twenty-five minutes), or in response to some other indication of user absence or inattentiveness. As mentioned above, the occupancy timer may be reset every time occupancy is determined, for example, by detecting motion. Once in the secondary mode 420, the system may transition to the primary mode 410 when 1) a power on command is received, 2) occupancy is detected, 3) the user disables the sensor or control functionality, or 4) a remote control command affecting primary mode operation is received. The system may transition from the secondary mode 420 to the power off mode 430 when a power off command is received. The system could also transition from the secondary mode 420 to the power off mode 430 in response to a shutoff timer, which could reset in response to detected activity. For example, the system may transition to the power off mode 430 if there is no activity (e.g., user commands, etc.) for a certain time period, such a two hours.

Figure 5A:
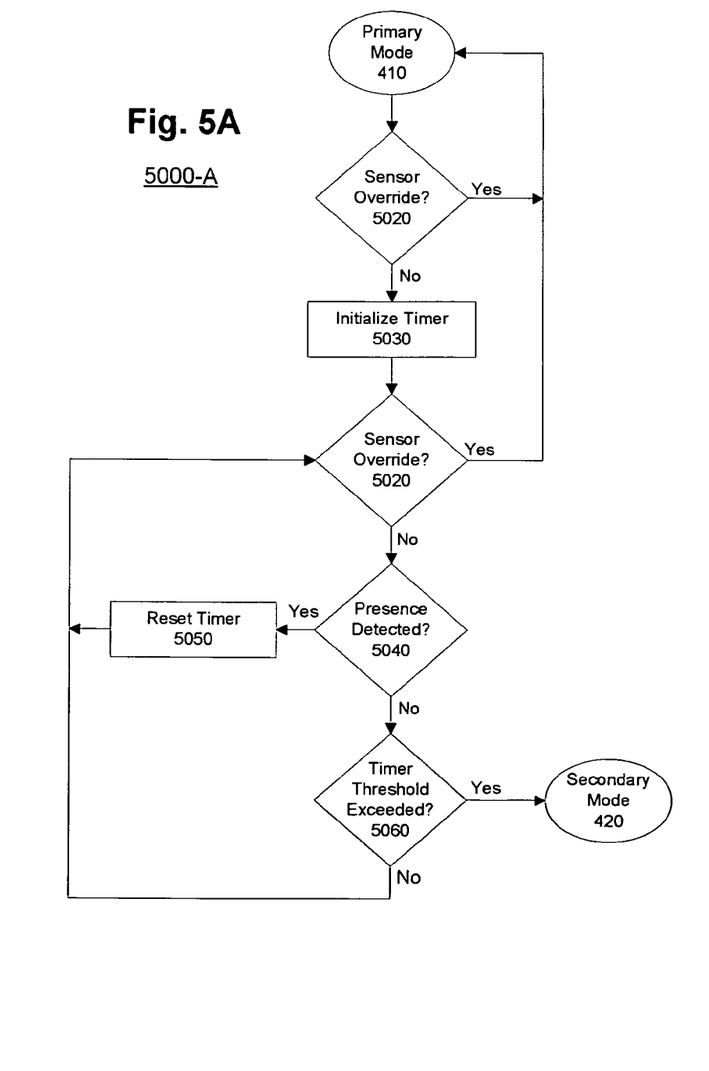
Figure 5B:
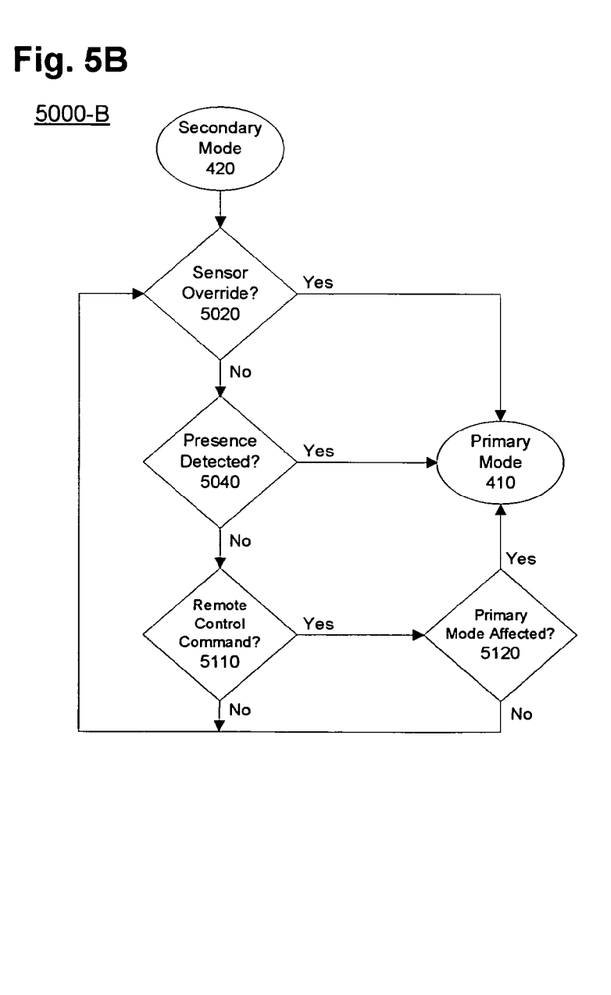

FIGS. 5A and 5B are flow diagrams depicting exemplary processes 5000-A and 5000-B, which may be performed by the control 117 in the content rendering system 110. The process 5000-A may begin when the content rendering system is switched into the primary mode 410 by activation of a power on command. Once content rendering system is in the primary mode 410, the process 5000-A may determine whether the user has defeated or overridden the sensor functionality (5020). In some examples, a user may interact with the control 117 to disable or override the monitoring and/or control functionality. The determining (5020) may involve examining a register in a memory of the control 117. If the user defeats the system (5020=yes), the process 5000-A may maintain primary mode operation.

If the user does not override the system (5020=no), then a timer may be initialized (5030). After initializing the timer, the process 5000-A may again check for an override (5020). If an override is received, then primary mode operation may be maintained. In the absence of an override, the process 5000-A may determine whether user presence is detected (5040). This may involve determining whether a user is present or absent from a space in which the content rendering system 110 is viewable. If presence is detected (5040=yes), then the process 5000-A may reset the timer (5050) and again check for an override (5020). If presence is not detected (5040=no), then the timer may continue to run and the process 5000-A may determine whether the timer exceeds a threshold value (5060). If the timer exceeds the threshold (5060=yes), then the process 5000-A may cause the content rendering system 110 to operate in the secondary mode 420. If the threshold is not exceeded (5060=no), the process 5000-A may again determine whether an override is received (5020) and whether occupancy is detected (5040). As indicated in FIG. 5A, the process 5000-A may continually check whether a user overrides the system and remain in the primary mode 410 until the timer exceeds a threshold (5060=yes).

The process 5000-B begins once content rendering system is operating in the secondary mode 420. As indicated in FIG. 5B, the process 5000-B may check for an override (5020). If the user overrides the system (5020=yes), then the process 5000-B may cause the content rendering system 110 to transition back to the primary mode 410. If there is no override (5020=no), then the process 5000-B may check for detected presence (5040). If user presence is detected while in the secondary mode 420 (5040=yes), then the content rendering system 110 may transition back to the primary mode 410. If presence is not detected (5040=no), the process 5000-B may check for a remote control command (5110). As long as no remote control command is issued (5110=no), the process 5000-B may repeat. If a remote control command is detected (5110=yes), then the process 5000-B may determine whether the detected command affects primary mode operation (5120). For example, the control 117 may determine whether the detected command affects video performance of the content rendering system 110. If the primary mode is affected (5120=yes), then the process 5000-B may cause the content rendering system 110 to transition back to the primary mode 410. As long as the primary mode is not affected (5120), the process 5000-B may repeat.

Figure 6:
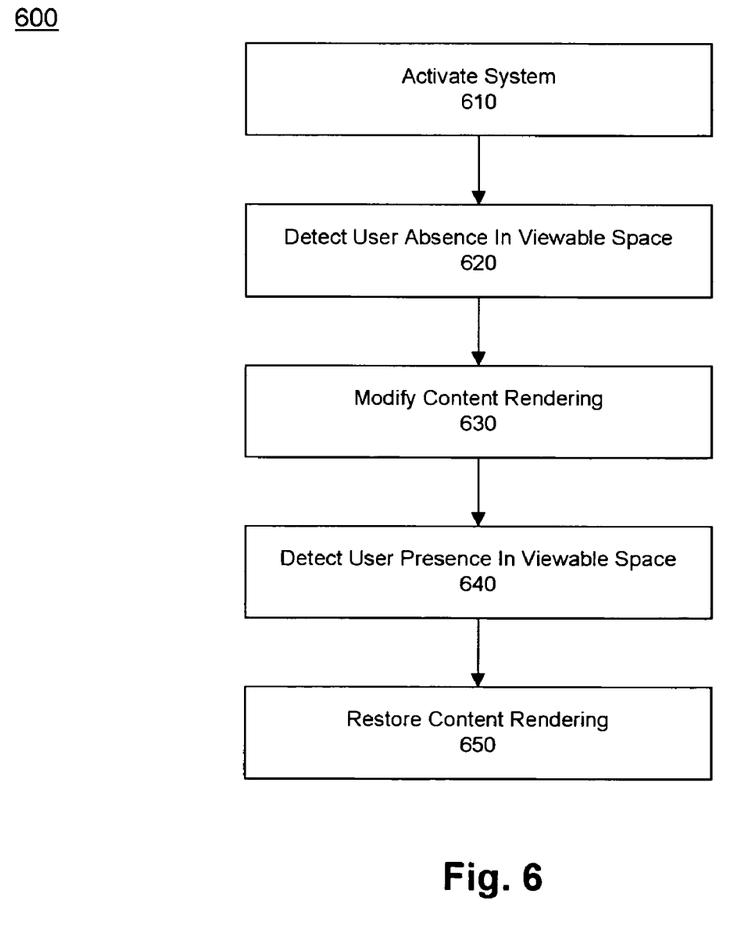

FIG. 6 is a flow diagram illustrating an exemplary sequence 600 of events performed by the content rendering system 110. In the sequence 600, the content rendering system 110 may be implemented as a plasma television device that includes the sensors 130 and the control 117 within its housing. The sequence 600 begins when a user activates the system (610). This may occur when a user turns on the television via a remote control. Once the television is activated, the sensors (e.g., 130) and the control (e.g., 117) may detect user absence in a space in which a display of the television is viewable (620). This may involve detecting user absence for a predetermined amount of time. In response to the detected user absence, the control may modify content rendering by the television (630). For example, video rendering may be deactivated while correlated audio remains active and adjustable. After the content rendering is modified, user presence may be detected in the viewable space (640). The control may re-activate normal content rendering in response to the detected user presence (650).

FIGS. 3-6 are consistent with exemplary implementations. The sequences of events in FIGS. 3-6 is exemplary and not intended to be limiting. Other processes may therefore be used and, even with the processes depicted in FIGS. 3-6, the illustrated events and their particular order in time may vary. Further, the illustrated events may overlap and/or may exist in fewer steps. Moreover, certain events may not be present and additional events may be included in the illustrated processes.

The foregoing description does not represent an exhaustive list of all possible implementations consistent with this disclosure or of all possible variations of the implementations described. Other implementations are within the scope of the following claims.

What is claimed is:

1. A method comprising: monitoring, based on physical user attributes, user occupancy within a space in which a video display of a content rendering system is viewable; based on the monitored user occupancy, selectively adjusting at least one of audio rendering and video rendering by the content rendering system; activating, based on the monitoring, a function in a recording device; and using a recording buffer in conjunction with an occupancy timer such that when the timer exceeds a threshold, program material is recorded from the buffer from a time when there was last occupancy until such time as the recording is stopped.

2. The method of claim 1, wherein monitoring user occupancy comprises using at least one of ultrasonic detection, pyroelectric detection, thermal detection, and visual detection.

3. The method of claim 1, wherein the monitoring includes monitoring user occupancy based on user motion within the space.

4. The method of claim 3, wherein the monitoring comprises: determining a presence of a user within the space based on user motion in the space; and determining an absence of a user from the space based on a lack of motion in the space for a predetermined amount of time.

5. The method of claim 4, wherein adjusting comprises: reducing a degree of video rendering by the display device in response to the detected absence.

6. The method of claim 5, wherein reducing a degree of video rendering comprises changing an operating mode of the video display from an active mode to a standby mode such that power consumption of the content rendering system is reduced.

7. The method of claim 5, wherein adjusting comprises: increasing a degree of video rendering by the display device in response to a detected presence of the user within the space.

8. The method of claim 7, wherein increasing a degree of video rendering comprises activating the video rendering in response to a command from a remote control.

9. The method of claim 1, wherein the monitoring comprises: segmenting the space into regions; and detecting movement of a user from a first region in the space to a second region in the space different than the first region.

10. The method of claim 1, wherein the monitoring is performed by the content rendering system.

11. A system, comprising: a content rendering device rendering audio and video portions of multimedia content; an occupancy sensor configured to detect user presence and user absence within a space in which the rendered video is viewable based on motion within the space; and a controller configured to adjust the content rendering system based on the user presence and the user absence, the controller adjusting the content rendering system to operate in a reduced power consumption mode in which power consumption is reduced while at least a portion of the multimedia content is rendered, wherein the controller is further configured to at least one of: activate a function in a recording device based on the detected user absence and presence, and transmit information reflecting the detected user absence and presence, wherein a recording buffer is used in conjunction with an occupancy timer such that when the timer exceeds a threshold, program material is recorded from the buffer from a time when there was last occupancy until such time as the recording is stopped.

12. The system of claim 11, wherein the content rendering device includes a television device.

13. The system of claim 11, wherein the content rendering device includes a computer display.

14. The system of claim 11, wherein the occupancy sensor is located in the content rendering device.

15. The system of claim 11, wherein the occupancy sensor utilizes at least one of an ultrasonic detector, a pyroelectric detector, a thermal detector, and a video capture device.

16. A system configured to: detect, based on motion in a space in which a person can view a video display, whether a person is present in a space, and if the person is not present, turn off at least a rendering of video by the video display while maintaining a rendering of audio correlated with the video, wherein the system is further configured to activate a function in a recording device if the person is not present, wherein a recording buffer is used in conjunction with an occupancy timer such that when the timer exceeds a threshold, program material is recorded from the buffer from a time when there was last occupancy until such time as the recording is stopped.

17. The system of claim 16, wherein the motion in the space is detected using a motion sensor coupled to the video display.

\* \* \* \* \*